US008205928B2

(12) United States Patent
Steffens et al.

(10) Patent No.: US 8,205,928 B2
(45) Date of Patent: Jun. 26, 2012

(54) FOLDING CARGO BAY COVER FOR PICKUP TRUCK

(75) Inventors: Charles J. Steffens, Ada, MI (US); Douglas C. Steffens, Clarksville, MI (US); Mark J. Heintskill, Grand Rapids, MI (US)

(73) Assignee: Steffans Enterprises, Inc., Caledonia, MI (US)

( * ) Notice: Subject to any disclaimer, the term of this patent is extended or adjusted under 35 U.S.C. 154(b) by 169 days.

(21) Appl. No.: 12/769,755

(22) Filed: Apr. 29, 2010

(65) Prior Publication Data
US 2010/0219658 A1 Sep. 2, 2010

Related U.S. Application Data

(62) Division of application No. 11/952,199, filed on Dec. 7, 2007, now Pat. No. 7,735,881.

(51) Int. Cl.
*B60P 7/02* (2006.01)
(52) U.S. Cl. ........ 296/100.07; 296/100.09; 292/DIG. 3; 292/DIG. 43
(58) Field of Classification Search ............. 296/100.01, 296/100.02, 100.04, 100.06, 100.07, 100.08, 296/100.09, 100.14; 292/DIG. 3, DIG. 4, 292/DIG. 43
See application file for complete search history.

(56) References Cited

U.S. PATENT DOCUMENTS

| | | | |
|---|---|---|---|
| 1,607,038 A | 11/1926 | Baron | |
| 2,560,459 A | 7/1951 | Lundberg et al. | |
| 4,844,531 A | 7/1989 | Kooiker | |
| 4,892,338 A | 1/1990 | Weinerman et al. | |
| 4,896,906 A | 1/1990 | Weinerman et al. | |
| 4,946,217 A | 8/1990 | Steffens et al. | |
| 4,951,486 A | 8/1990 | Braun et al. | |
| 5,069,491 A | 12/1991 | Weinerman et al. | |
| 5,586,458 A | 12/1996 | Weinerman et al. | |
| 5,595,076 A | 1/1997 | Weinerman et al. | |
| 5,653,491 A | 8/1997 | Steffens et al. | |
| 5,857,729 A * | 1/1999 | Bogard | 296/100.09 |
| 5,941,104 A | 8/1999 | Sadler | |
| 6,325,439 B1 | 12/2001 | Crossman | |
| 6,422,635 B1 | 7/2002 | Steffens et al. | |
| 6,454,337 B2 | 9/2002 | Steffens et al. | |
| 6,490,895 B1 | 12/2002 | Weinerman et al. | |
| 6,497,445 B1 | 12/2002 | Combs, II | |
| 6,520,559 B1 | 2/2003 | Steffens et al. | |
| 6,527,330 B1 | 3/2003 | Steffens et al. | |
| 6,565,141 B1 | 5/2003 | Steffens et al. | |
| 6,729,701 B2 | 5/2004 | Carter et al. | |
| 6,758,503 B2 | 7/2004 | Sadler | |
| 6,899,362 B1 | 5/2005 | Weinerman et al. | |

(Continued)

*Primary Examiner* — Dennis Pedder
*Assistant Examiner* — Jason S Daniels
(74) *Attorney, Agent, or Firm* — Warner Norcross & Judd LLP

(57) ABSTRACT

A cargo bay cover for a pickup truck includes at least first and second panels hingedly connected to each other. The first panel includes a release mechanism including a lever arm that is movable between a released position and an unreleased position, and a lock that is movable to a locked position preventing movement of the lever arm. The cover includes a resiliently deformable panel latch that is released when the first panel is opened and that is capable of flexing around a keeper if the cover is opened incorrectly. The cover includes a unique mounting clamp for attachment to the pickup truck. A second half of the mounting clamp rides up a shoulder on a first half of the mounting clamp as the halves are drawn together, enabling the to pinch in two directions—one parallel to the drawing force and another perpendicular to the drawing force.

10 Claims, 11 Drawing Sheets

U.S. PATENT DOCUMENTS

| | | |
|---|---|---|
| 7,036,861 B2 | 5/2006 | Steffens et al. |
| 7,040,675 B1 | 5/2006 | Ott et al. |
| 7,052,071 B2 | 5/2006 | Mulder et al. |
| 7,195,299 B2 | 3/2007 | Steffens et al. |
| 2001/0035664 A1 | 11/2001 | Steffens et al. |
| 2005/0264024 A1* | 12/2005 | Mulder et al. ........... 296/100.07 |

* cited by examiner

FOLDING CARGO BAY COVER FOR PICKUP TRUCK

This application is a division of U.S. patent application Ser. No. 11/952,199, filed Dec. 7, 2007 (now U.S. Pat. No. 7,735, 881).

BACKGROUND OF THE INVENTION

The present invention relates to a cargo bay cover (tonneau) for a pickup truck, and more particularly to a cover including one or more rigid panels which may be folded and unfolded to uncover and recover the cargo bay.

Tonneau covers are well known for covering and protecting the cargo bay of a conventional pickup truck. These covers are useful for various types of cargo. One such cover, disclosed in U.S. Pat. No. 6,527,330 to Steffens et al., includes a plurality of low-silhouette panels which are relatively lightweight and can be quickly and easily folded, one upon the other, accordion style, to gain access to or to expose the cargo bay, and unfolded quickly and easily to cover the cargo bay. The panels are configured so that the "first" panel farthest from the cab folds back on top of the panel adjacent to it. The second and third panels fold together such that their under surfaces contact each other, and the third panel folds back on top of the fourth panel, which is closest to the cab of the truck. Alternatively, the fourth panel may be opened and folded against the third panel to provide access to the portion of the cargo bay that is immediately adjacent to the truck cab.

In this arrangement, the first panel and the fourth panel (i.e. those panels farthest from and closest to the cab each include a combined lock and release mechanism that prevents the panel from being opened until a key is inserted and rotated by the user. A pair of throw rods are directly connected between the lock and a pair of latches, such that rotation of a key in the lock moves the throw rods and latches to a released position, in which the panel can be opened.

As good as this tonneau cover is, there continues to be room for improvement. First, the combined lock and release mechanism is complicated, with multiple moving parts that can only be actuated by the rotation of a key. The mechanism requires two hands for operation, which could be further complicated if the user is wearing gloves. Further, the rods on the underside of the cover reduce the usable height of the cargo bay. Second, the second and third panels can "balloon" or raise off the cargo bed when the truck is operated at highway speeds. Such ballooning can decrease the effectiveness of weather seals. Finally, it can be difficult to mount the keepers to the truck bed in a simple, yet secure fashion.

SUMMARY OF THE INVENTION

The present invention provides a multiple-panel cargo bay cover that includes 1) a simple, low-profile lock mechanism, 2) a rigid, easily installable latch clamp, and 3) a latch member on at least one of the second and third panels to prevent ballooning of those panels.

In a first aspect of the invention, the cover includes a lock that engages a lever arm on the release mechanism to prevent the release mechanism from moving between a released position and an unreleased position. In one embodiment, the lock and the release mechanism are separate from each other, but both are supported within a panel of the cover. The lever arm may be connected to a pair of latches on opposite ends of the panel by flexible connectors. This efficient mechanism ensures security of the cargo bay, and at the same time reduces complexity of the lock mechanism, thereby reducing chance of mechanical failure or malfunction.

In a second aspect of the invention, a tonneau cover including at least one hinged panel is adapted to be mounted on the truck over the storage area. A keeper is mounted on the truck adjacent the storage area, and the one hinged panel includes a latch that is movable between a latched position engaging the keeper, and an unlatched position, free of the keeper. The latch automatically moves between the latched and unlatched positions with movement of the first panel. In a preferred embodiment, the latch is sufficiently rigid to retain the cover in position when the cover experiences normal loads, and the latch is sufficiently resiliently flexible to enable it to flex around the keeper when the cover experiences abnormally high loads. For instance, if an operator incorrectly opens the cover by not first folding the first panel onto the second panel, the latch will bend sufficiently to release but will not permanently deform.

In a third aspect, the present invention includes a clamp adapted to be securely mounted on an L-shaped member. In one embodiment, the clamp includes a keeper for engaging a latch and the L-shaped member is the sidewall of a truck storage area. The clamp includes a first clamp half and a second clamp half that can be drawn together about the L-shaped member. In one embodiment, the first clamp half includes a shoulder, and the second clamp half includes a foot that engages the shoulder. As the clamp halves are drawn together, for instance, by tightening a bolt, the foot rides up the shoulder so the second clamp half is pulled both (1) inward against the first body portion of the L-shaped member, and (2) upward toward the second body portion of the L-shaped member. This second component of the motion also pulls the first clamp half downward to sandwich or pinch the L-shaped member therebetween. This arrangement enables simple, yet secure installment of the clamp on the sidewall of the truck storage area.

These and other objects, advantages, and features of the invention will be more readily understood and appreciated by reference to the detailed description of the preferred embodiment and the drawings.

DESCRIPTION OF THE CURRENT EMBODIMENT

Figure 1:
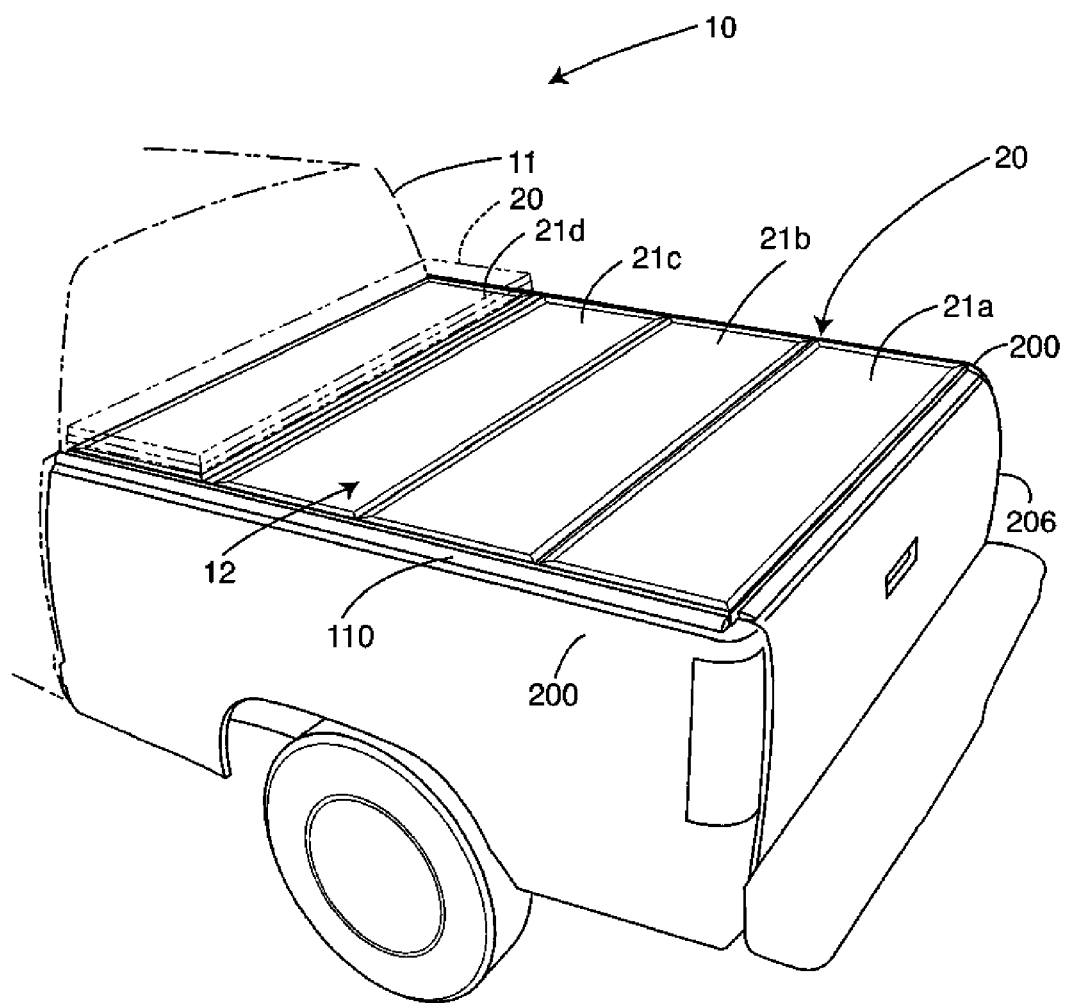
FIG. 1 is a perspective view of a pickup vehicle with a cargo bay cover according to one embodiment of the present invention. The cover is shown closed in solid lines and opened from the back in broken lines.
Figure 2:
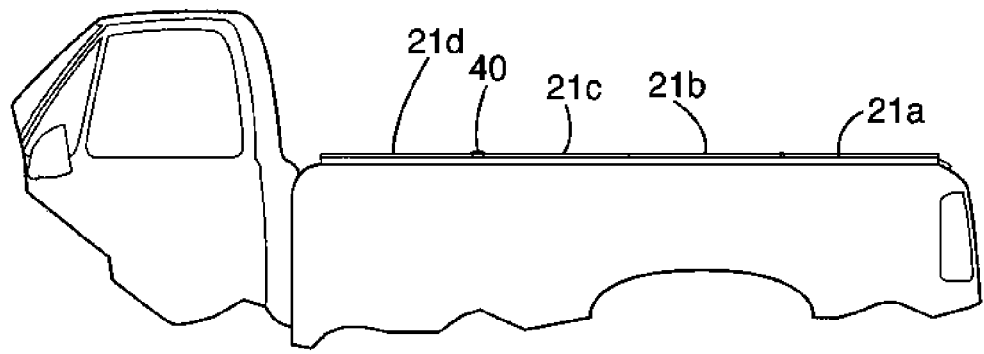
FIG. 2 is a side elevational view of the closed cover.

A foldable cargo bay cover according to one embodiment of the present invention is illustrated in FIG. 1 and generally designated 20. The cover 20 is used in conjunction with a conventional pickup truck 10 having cab 11 and a cargo bed or storage area 12 having a pair of sides 200 and a fold down tailgate 206. The cover 20 is mounted over the open top of the cargo space of the cargo bed. In the illustrated embodiment, the cover 20 includes four panels 21a-d, a lock mechanism 210 for releasably securing the first panel to the truck bed 12, a secondary latch mechanism 500 for additionally securing another one of the panels 21a-d to the truck bed 12, and a clamp 507 secured to the truck bed 12 and including a keeper for interfitting with the secondary latch mechanism 500.

FIG. 1 illustrates the cover 20 in an extended or closed cargo space position in solid lines and a retracted or open cargo space position in broken lines. In one embodiment, the cover 20 consists of a plurality of panels 21a, 21b, 21c and 21d denominated the first, second, third, and fourth panels respectively. Alternatively, the cover may consist of more or fewer panels. The panels are collectively sized and shaped to cover the cargo bed. Sometimes this will result in the panels being highly similar or even identical. Other times the panels may be quite different from one another.

Figure 3:
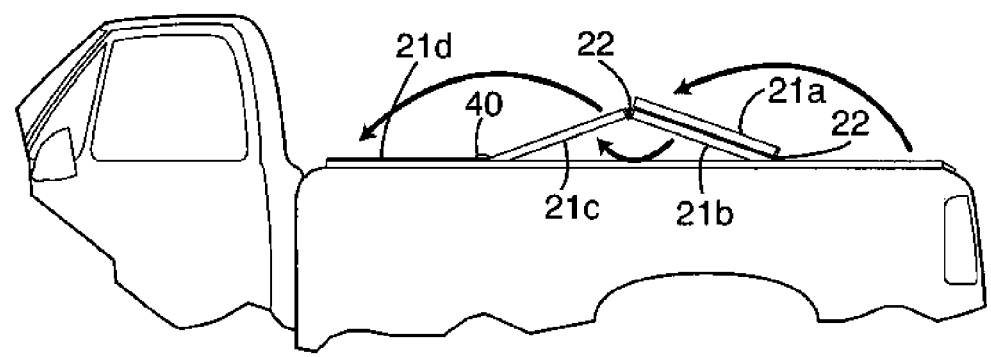
FIG. 3 is a side elevational view of the cover in a first folding configuration showing the first panel folded onto the second panel, and further showing the second and third panels slightly raised during opening.
Figure 4:
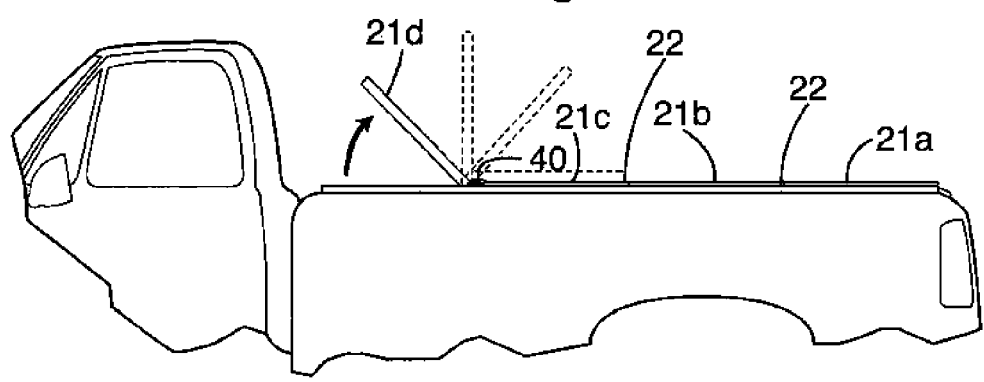
FIG. 4 is a side elevational view of the cover showing the independent operation of the fourth panel.

As depicted in FIGS. 3 and 4, panels 21a and 21b, and 21b and 21c are joined together at hinges 22 about which the leaves of the hinge pivot. As best seen in FIG. 3, the hinges 22 between panels 21a and 21b, and 21b and 21c are placed slightly below the lower surface of the panels, thus, adjacent panels fold in opposite directions. Panels 21c and 21d are joined together and pivot at frame member 40. A wind seal 110 may extend from each side of the cover 20 to prevent contaminants such as rain and dirt from entering the storage area. As best illustrated in FIG. 4, the fourth panel 21d may be independently opened against the third panel 21c and closed over the cargo bay using a hinging or folding motion.

Figure 6:
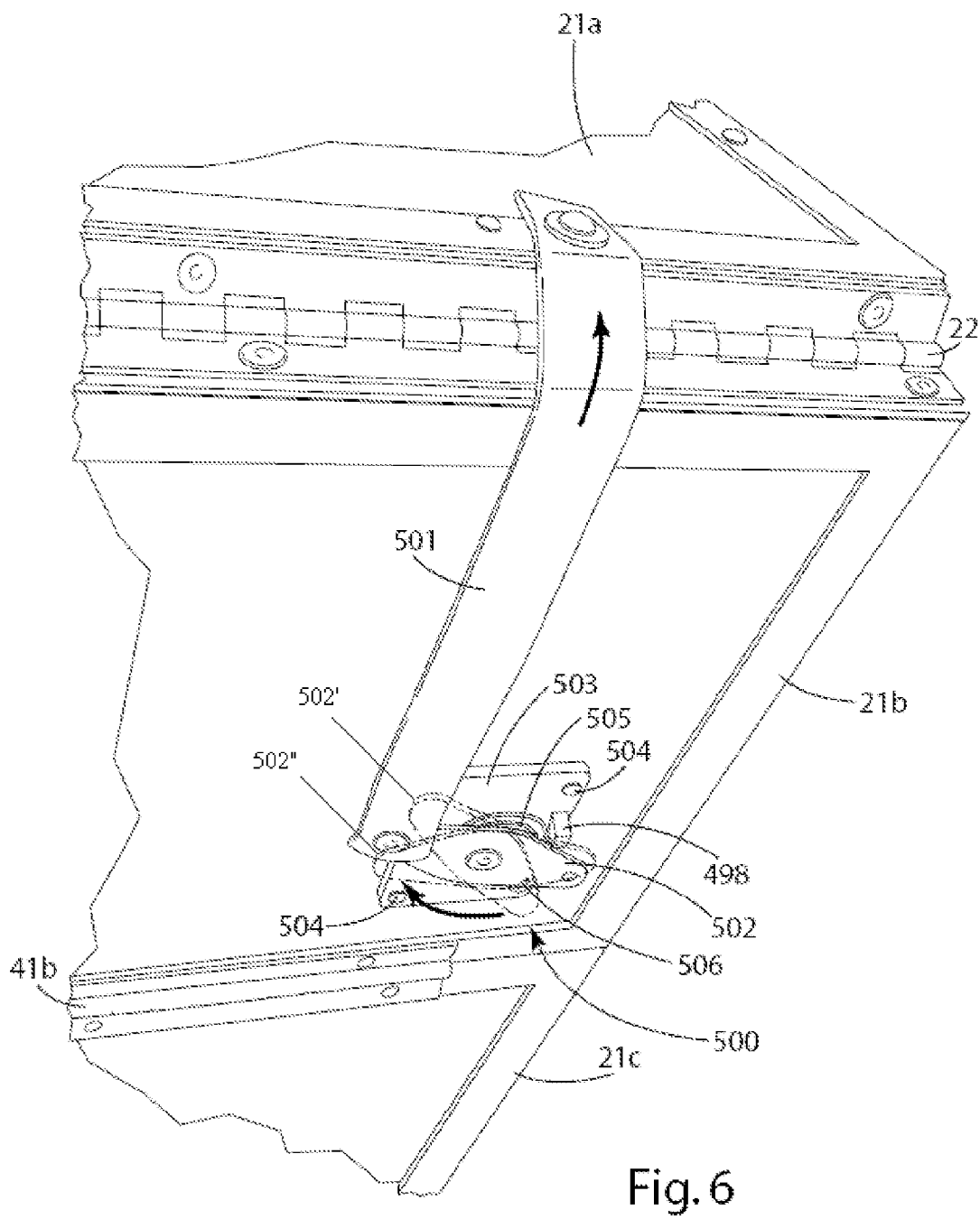
FIG. 6 is a perspective view of the strap-latch release mechanism with the fully latched and fully unlatched positions shown in phantom.
Figure 7:
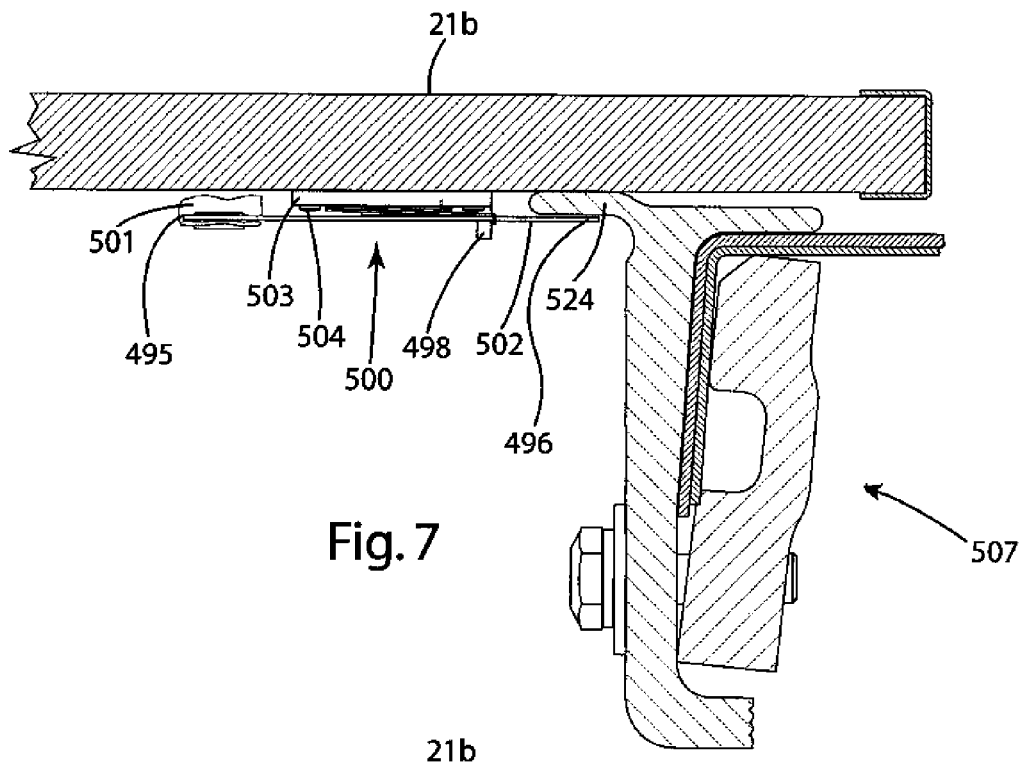
FIG. 7 is a cross sectional view of the mounting bracket clamp and the panel latch in a latched position.
Figure 8:
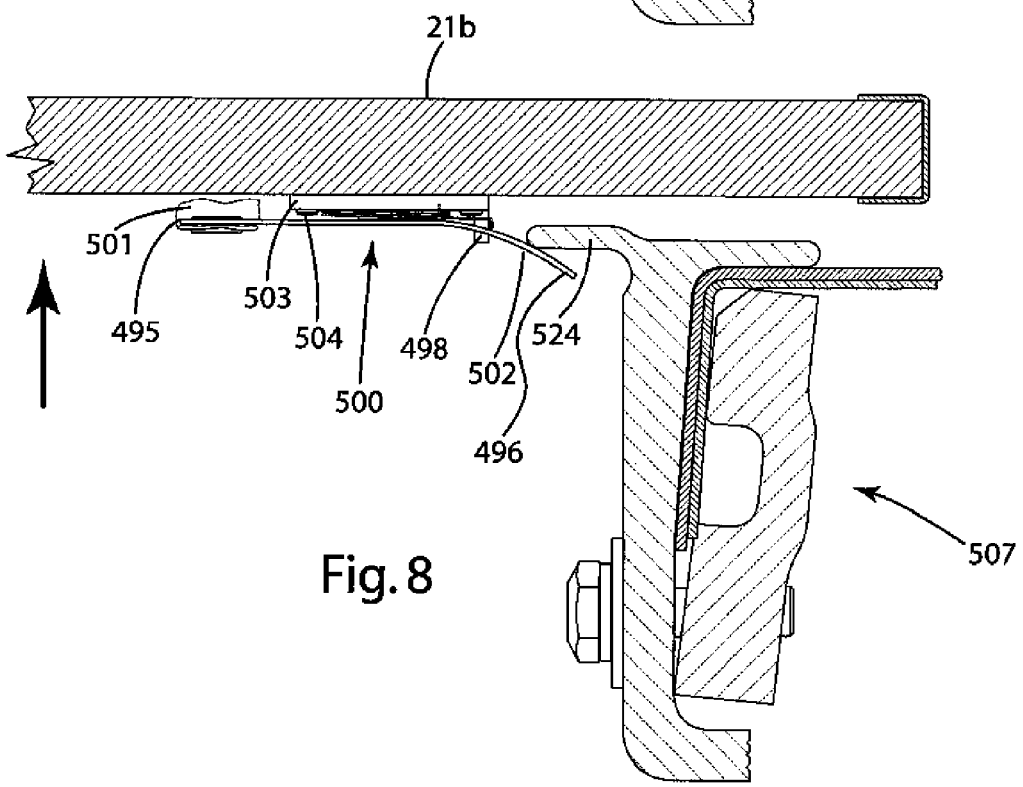
FIG. 8 is a cross sectional view of the mounting bracket clamp and the panel latch, wherein the panel latch is in a deformed state.
Figure 9:
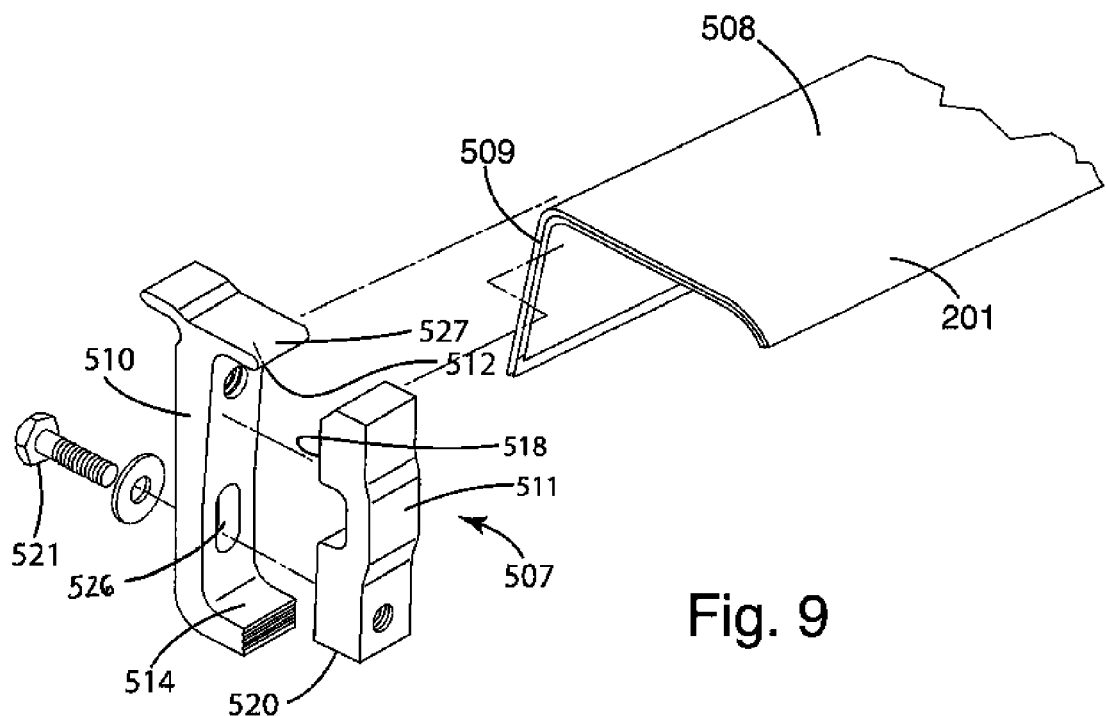
FIG. 9 is an exploded view of the L-shaped frame member and mounting clamp.

As depicted in FIGS. 6-8, at least one of the cover panels, such as cover panel 21b, includes a latch mechanism 500 that is capable of securing the cover panel to the truck cargo area 12. As shown in FIG. 6, the latch mechanism 500 may be connected to one end of a strap 501 that is attached at the other end to the adjacent first cover panel 21a. In one embodiment, the latch mechanism 500 is mounted on mounting plate 503, which is secured to the cover panel 21b by screws 504. A secondary latch plate 502 is pivotally mounted to the mounting plate 503, such that the latch plate 502 is moveable between a latched position (shown in phantom lines in FIG. 6) and an unlatched position (shown in solid lines in FIG. 6). In the illustrated embodiment, the latch plate 502 is a diamond shaped plate, but a variety of shapes may be used. One longitudinal end 495 of the plate 502 is attached to the strap 501. As shown in FIG. 7, the other end 496 of the plate 502 is moveable to engage a flange, or keeper, 524. Referring again to FIG. 6, in one embodiment, the latch mechanism 500 includes a torsion spring 505 that is positioned between the mounting plate 503 and the latch plate 502, and a latch stop 498 extending from the mounting plate 503. In the illustrated embodiment, the torsion spring 505 is attached to the mounting plate 503, and includes an end 506 that hooks around the edge of latch plate 502. The latch stop 498 is positioned opposite the end 506. The spring 505 biases the latch plate 502 against the latch stop 498 and in the latched position.

The latch plate 502 rotates between the fully latched position 502' and the fully unlatched position 502", both illustrated in phantom in FIG. 6. When the first panel 21a is closed against the cargo bed, the latch 502 rotates under the force of spring 505 to the fully latched position 502'. When the first panel 21a is fully opened or rotated against the second panel 21b, the strap 501 pulls the latch 502 to the fully unlatched position 502". When the first panel 21a is only partially opened, the latch 502 will be somewhere between the fully latched and fully unlatched positions as illustrated in FIG. 6.

Figure 5:
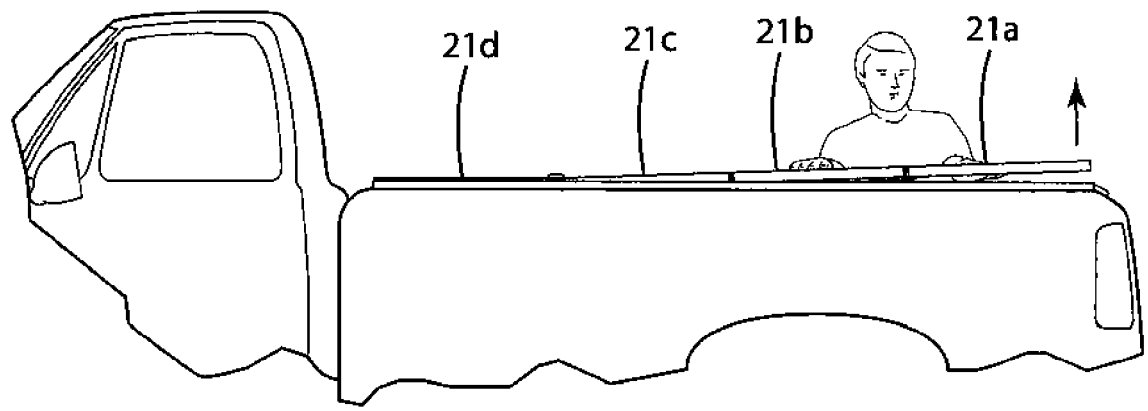
FIG. 5 is a side elevational view of the cover being opened incorrectly.

The secondary latch plate 502 may be made from a variety of materials, and may have a variety of shapes or sizes. In one embodiment, shown in FIG. 8, the latch plate 502 is made from a spring steel alloy, and is provided with a thickness such that the latch plate 502 rigidly engages the flange 524 and prevents the cover 20 from opening under normal loads, but has sufficient flexibility that it will bend around the flange 524, as in FIG. 8, and then recover to a generally flat state. FIG. 5 shows an example of a situation where the latch plate 524 may be subject to an abnormal load, because, as shown, the operator is forcing the cover 20 up in the direction of the arrow without first folding back the cover panel 21a. In this instance, the strap 501 is not pulled to rotate the latch plate 502 to the unlatched position, and thus, if forced hard enough, the latch plate 502 bends around the keeper 524 to allow the cover to be opened.

Figure 11:
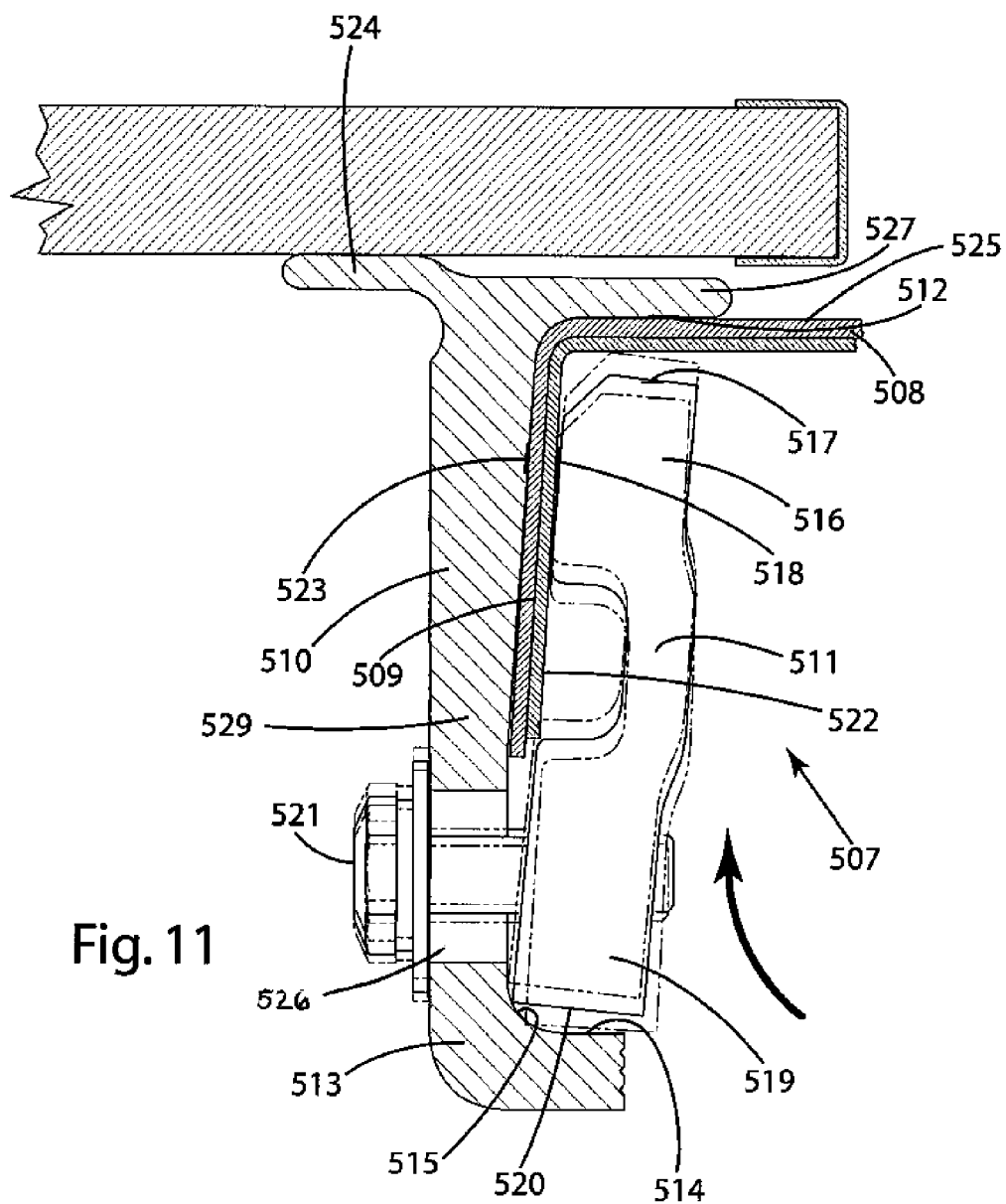
FIG. 11 is a cross sectional view of the mounting clamp in operation.

As depicted in FIG. 11, in one embodiment, the present invention includes a mounting clamp 507 that clamps onto an L-shaped member 201 having first body portion 508 and second body portion 509, such as the lip on the sidewall 200 of a truck bed. The L-shaped member 201 has an interior surface 522 and an exterior surface 525. As noted above and depicted in FIGS. 7 and 8, in one embodiment, the clamp 507 includes a flange or keeper 524 that extends from the clamp and interfits with the latch plate 502 described above. In another embodiment, the clamp 507 may be used to mount a variety of other devices, tools or materials to a truck bed, or to another L-shaped member. In the illustrated embodiment, mounting clamp 507 has first clamp half 510 and second clamp half 511. First clamp half 510 has an upper flange 527 that includes a first clamp portion 512. First clamp half 510 also has a lower flange 514 that forms a shoulder 513 with the main body 529 of the first clamp half 510. In one embodiment, the shoulder 513 has a radiused interior surface 515. The main body 529 of the first clamp portion has an interior side 523, which forms a second clamp portion.

In one embodiment, the second clamp half 511 is sized to fit between the upper flange 527 and the lower flange 514 of the first clamp half 510. The second clamp half 511 has an upper portion 516 with a top edge 517 that forms a third clamp portion, and an interior surface 518 that forms a fourth clamp portion. The second clamp half 511 also has a lower portion 519, with a bottom edge 520 that forms a foot for the second clamp half. Each clamp half defines an axial recesses (not pictured), through which a bolt 521 can be extended, and tightened or loosened.

As depicted in FIG. 7, in one embodiment, the latch flange 524 on the clamp 507 is designed to interfit with the secondary latch plate 502. In this embodiment, the latch flange 524 runs substantially parallel to the cover panel 21*b*. When the cover 20 is set in place, the mounting clamp 507, clamped against the truck side's L-shaped lip, acts as a keeper for latch plate 502, which rests in a straight, latched position under latch flange 524 to retain the cover 20 on the truck. As noted, in this position, the latch plate 502 is sufficiently rigid to prevent removal of the cover when the cover experiences normal loads, such as wind or a user initially attempting to open the cover with the latch in place, feeling the resistance provided by latch plate 502 under latch flange 524, and discontinuing the effort.

Figure 10:
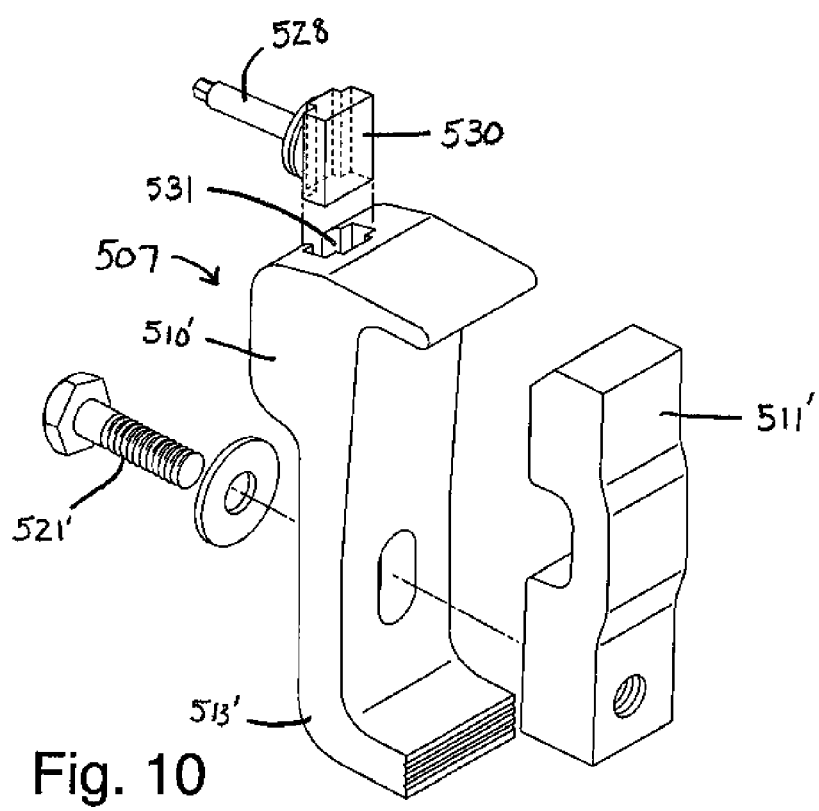
FIG. 10 is an exploded view of an alternative mounting clamp with adjustable striker.

An alternative embodiment of the clamp 507' is illustrated in FIG. 10. In this embodiment, the first clamp half 510' and second clamp half 511' are substantially the same as in the first described embodiment, except that the clamp 507' includes an adjustable striker bolt 252 instead of latch flange 524. As described below, the striker bolt 252 may be used in connection both with the lock and release mechanism 210 on the first panel 21*a* and with a suitable lock and release mechanism (not shown) on the fourth panel 21*d*. In the illustrated embodiment, the striker bolt 252 is adjustably mounted to the first clamp half 510' by a T-shaped nut 530' that slidably fits within a T-shaped slot 531' in the first clamp half 510'. The striker bolt 252 is threadedly mounted to the T-shaped nut 530', such that the bolt 252 can be rotated to tighten the nut 530' within the slot 531' at a desired height. As in the first described embodiment, in the alternative embodiment, the first clamp half 510' includes a shoulder 513' that engages a foot 520' on the second clamp half 511'. As such, the alternative clamp is also capable of being securely fastened to an L-shaped member by tightening a bolt 521'.

FIGS. 12-15 show one embodiment of the lock mechanism and the release mechanism for the cargo bay panels. The lock mechanism, generally designated 210, may be mounted on one or more cover panels 21 to provide access to the cargo bay under the cover, while also securing the cargo bay cover. In the illustrated embodiment, the lock mechanism and release mechanism are shown in connection with cover panel 21*a*. As shown, the lock mechanism 210 includes a bottom lock plate 212 which is fastened to panel 21*a* by way of small screws 214 and large screws 215. The bottom lock plate 212 provides a platform on which to mount the lock mechanism 210.

Figure 12:
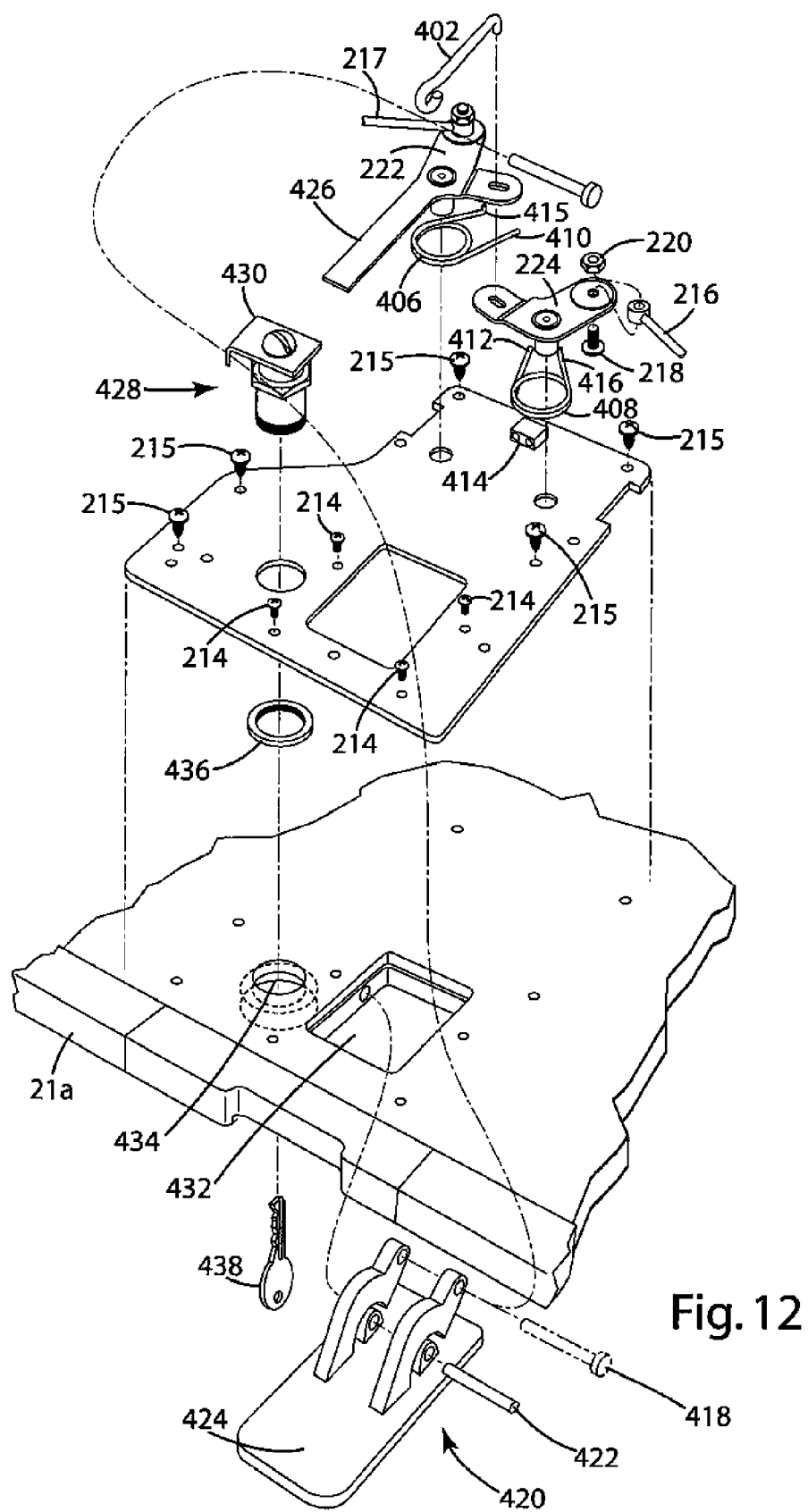
FIG. 12 is an exploded view of the lock mechanism.
Figure 13:
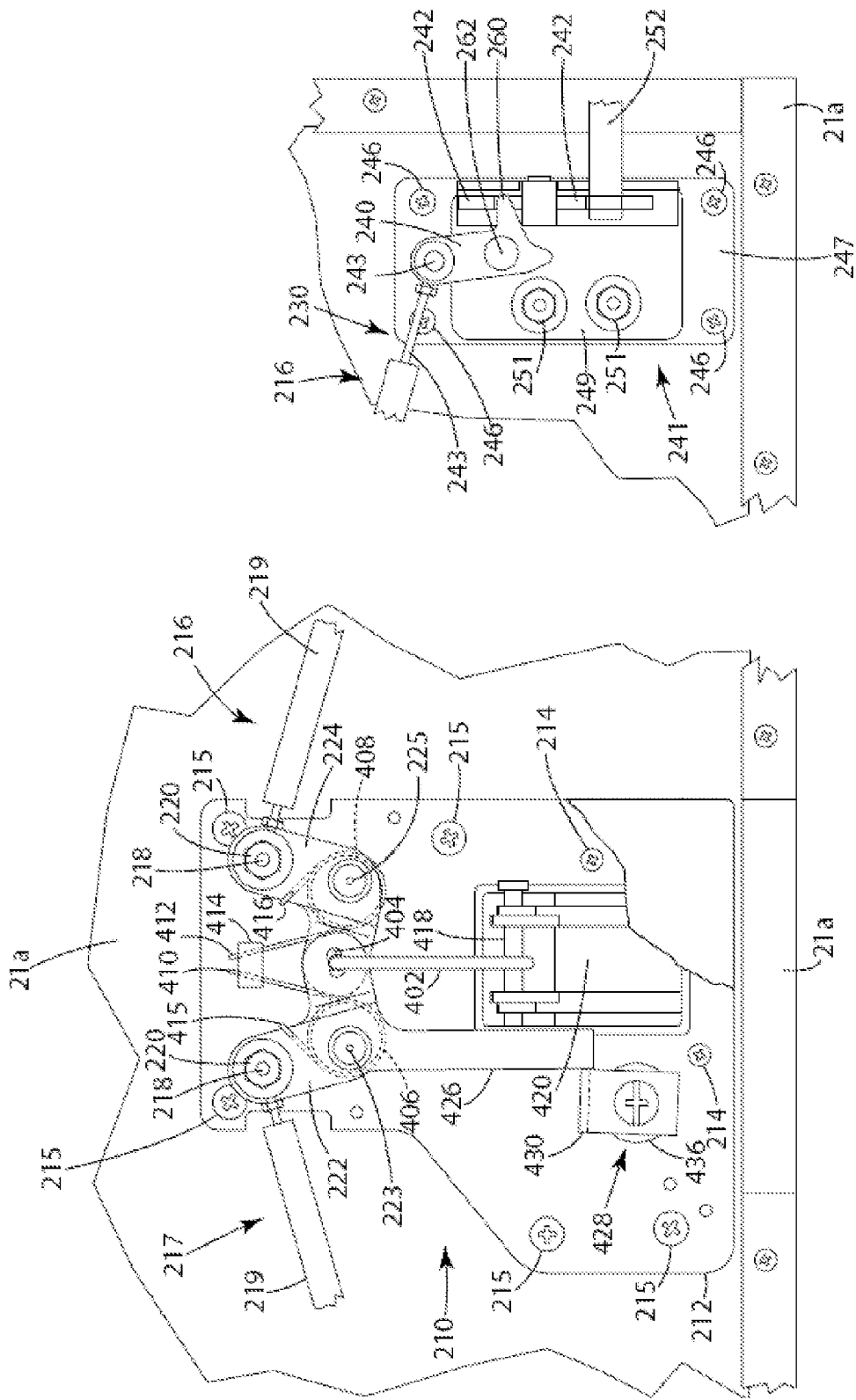
FIG. 13 is a top plan view of the lock mechanism when the lock is in the locked position and the lever arm is in the unreleased position.

With regard to the release mechanism, a pair of flexible connectors 216 and 217 are each interconnected between a pairs of cams 222, 224 and a pair of latch mechanisms 241 (only one latch mechanism is shown). The flexible connectors 216, 217 attach to a first, movable portion of the cams 222, 224 between cam screws 218 and cam nuts 220. In order to prevent damage to the flexible connectors 216 and 217, which in the illustrated embodiment are composed of a thin metal cable, the connectors 216 and 217 are covered and protected by a flexible rubbery cover 219. The cams 222, 224 pivot about pins 223, 225 and the cams 222, 224 are connected to each other by a pull rod 402 that extends through an aperture 404 in each of the cams 222 and 224. As shown in FIGS. 12 and 13, the cams 222, 224 are movable between an unreleased position, shown in FIG. 13, and a released position, shown in FIG. 14. Torsion springs 406 and 408 are included to bias the cams in an unreleased position. The torsion springs 406, 408 each include prong ends 410 and 412 respectively that fit under prong end holder 414. Torsion springs 406 and 408 also have ends 415 and 416 hooked around cams 222 and 224. The pull rod 402 is also hooked around a handle rod 418, which connects to the underside of handle 420. Handle 420 also has rotation rod 422 and handle lip 424. Handle 420 extends through aperture 432, defined within cover 21*a*, such that the handle lip 424 is accessible to a user on the exterior of the cover 20, while it connects to the rest of the release mechanism on the interior of the cover 20.

The ends 230 of flexible connectors 216, 217 opposite the cams 222, 224 are connected to latch mechanisms 241. As shown, the connector end 230 includes a connector end screw 243, which extends through latch cam 240. Latch cam 240 pivots around latch cam bolt 262 and has a cam lip 260 which is engaged with a release cam 242. As shown in FIGS. 12 and 13, the latch cam 240 is movable, upon movement of the cams 222, 224, between a latched position, shown in FIG. 13, and an unlatched position, shown in FIG. 14. In the latched position, latch release cam 242 securely prevents the cover from being rotated by securely locking a striker bolt 252 in place. The striker bolt 252 can be mounted on the truck bed, for instance, on the side mounting clamp 507' adjacent the latch flange 524. In the unlatched position, the latch cam 240 pulls the release cam 242 to move the release cam 242 from above the striker bolt 252 to release the striker bolt 252 and cover panel 21*a*. The latch mechanism 241 may further include a bottom latch plate 247 which is secured to the cover panel 21*a* by screws 246, and an upper latch plate 249, secured to the bottom latch plate by bolts 251. Together, the bottom latch plate 247 and upper latch plate 249 support the latch mechanism 241.

In one embodiment, cam 222 has a pivotal lever arm 426 extending from the cam 222 opposite the portion connected to the flexible connector 217. In the illustrated embodiment, the lever arm 426 is essentially a straight, relatively long rod that extends from the can 222. Of course, the size, shape and location of the lever arm could be changed depending on the arrangement of the release mechanism and the lock mechanism 210. The lock mechanism 210 includes a lock 428 extending through the cover panel 21*a* and having a lock stop 430 extending from the lock adjacent the lower surface of the cover 21*a*. In one embodiment, the lock stop 430 is movable—upon rotation of a key 438 in a keyhole (not shown)—between a locked position, shown in FIG. 13, wherein the lock stop 430 engages the lever arm 426 to prevent movement of the lever arm 426, and an unlocked position, shown in FIG. 14, wherein the lock stop 430 is rotated away to allow movement of the lever arm 426 to the released position. In the illustrated embodiment, the lock 428 extends through aperture 434 defined within cover 21*a*, and is tightened with nut 436. Key 438 fits into a keyhole (not pictured) of lock 428 in the side opposite of lock stop 430.

III. Operation

Figure 14:
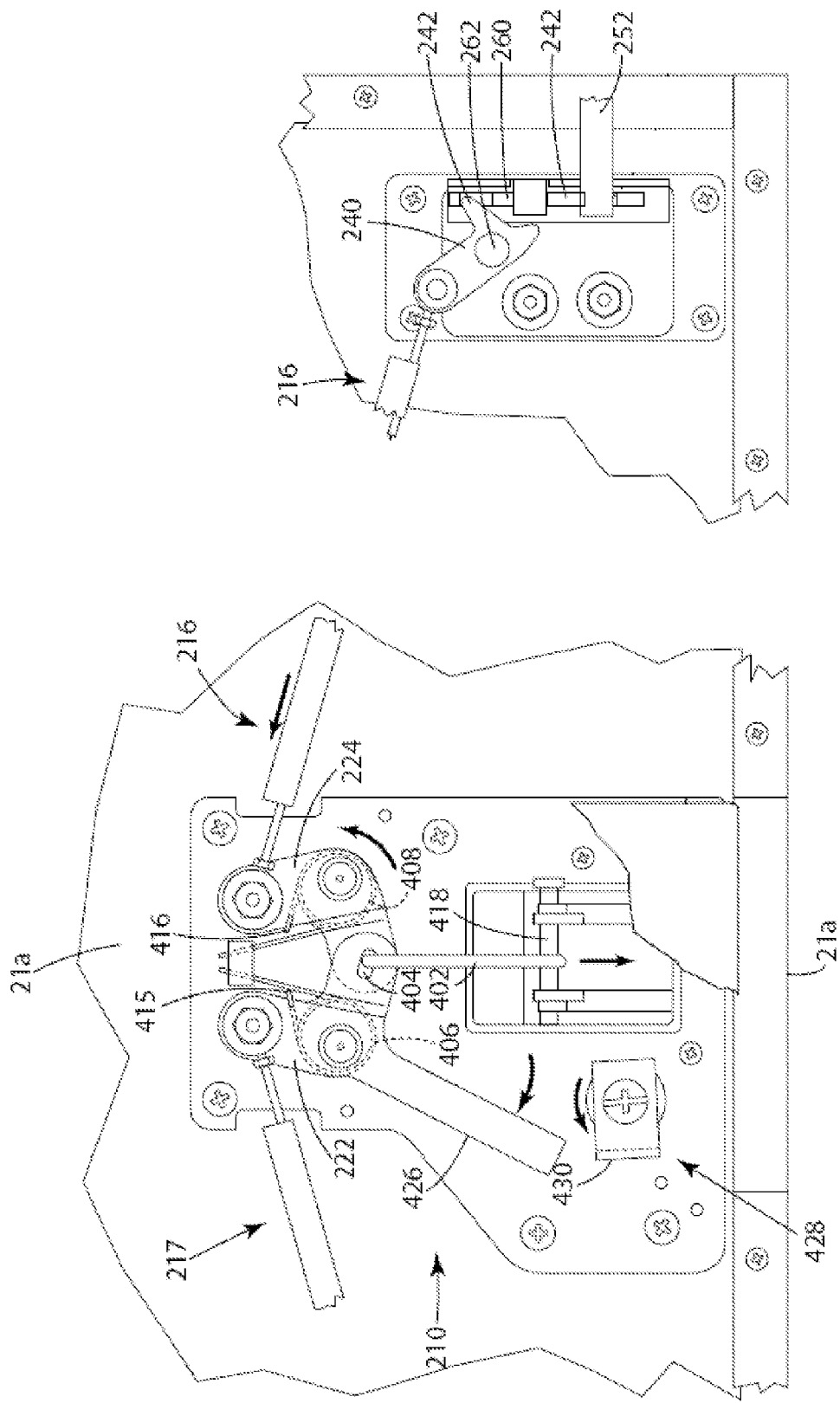
FIG. 14 is a top plan view of the lock mechanism with the lock in the unlocked position and the lever arm in the released position.
Figure 16:
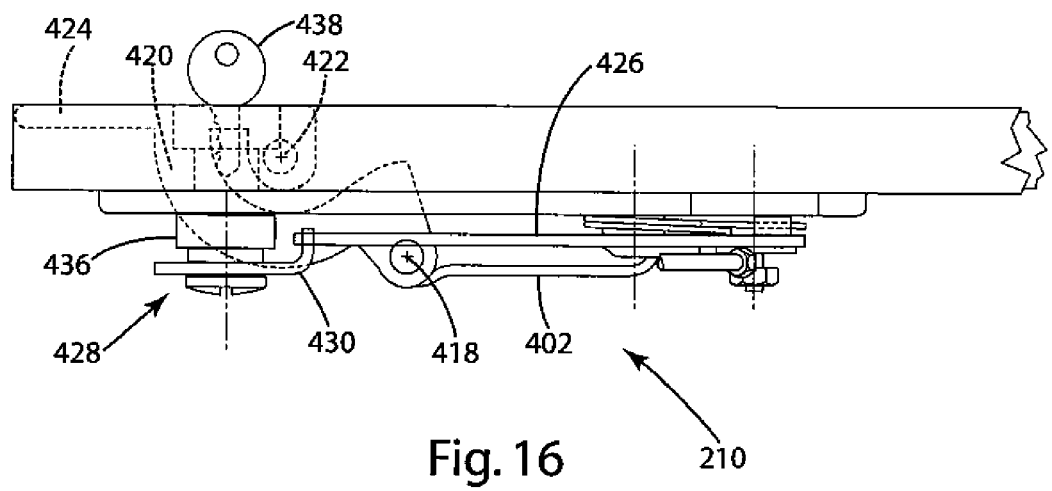
FIG. 16 is a side view of the lock in the locked position and the lever arm is in the unreleased position.
Figure 15:
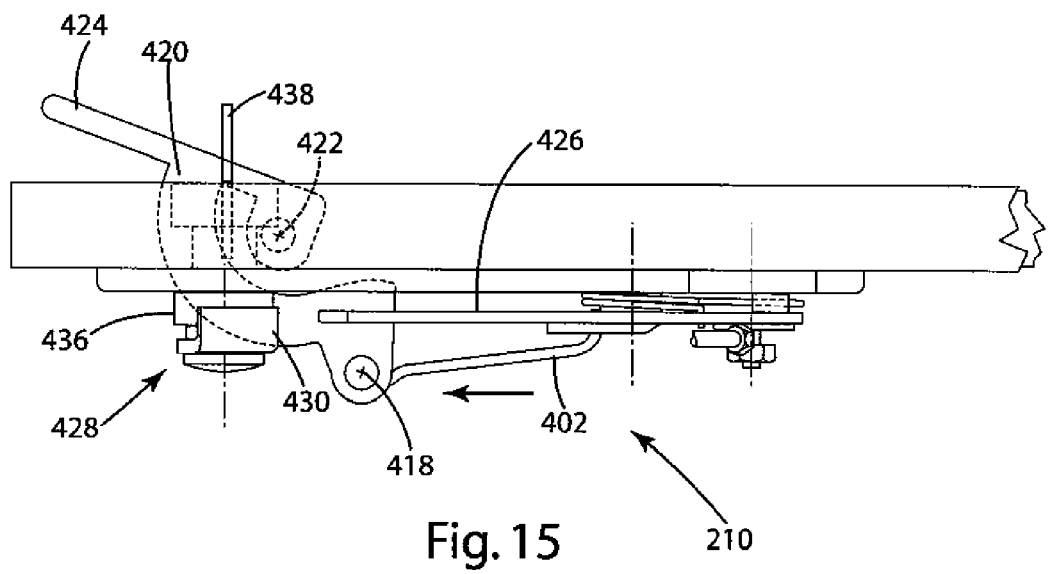
FIG. 15 is a side view of the lock in the unlocked position and the lever arm in the released position.

With reference to FIGS. 11-15, the operation of the lock mechanism 210 and release mechanism will now be described. FIGS. 12 and 15 show the lock mechanism in the locked position and the release mechanism in the unreleased position. As shown, lock 428 is in a locked position, with the lock stop 430 engaged against pivotal lever arm 426, preventing it from rotating clockwise. FIGS. 13-14 show the lock mechanism 210 and release mechanism in the unlocked, and released, positions. As shown, the key 438 has been rotated in the keyhole, thus rotating the lock stop 430 out of contact with the lever arm 426. Handle 424 is lifted, thus pulling the pull rod 402, and rotating both cams 222, 224. Cam 222 is allowed to freely rotate, because the lever arm 426 is not prevented from moving by the lock stop 430. As a result of the cams 222, 224 rotating, the flexible connectors 216, 217 are pulled and consequently pull the latch cams 240. The latch cams 240 move to the unlatched position, and pull the release cams 242 to an unlatched position wherein the cover panel 21*a* can be lifted.

The operation of the secondary latch mechanism 500 is described in connection with FIGS. 5-8. It is noted that, in the illustrated embodiment, the cover 20 must be opened in a specific manner once the lock mechanism 210 is unlocked. In this embodiment, a user must first rotate panel 21*a*, which in turn pulls the strap 501 to release the latch 502. Referring to FIG. 6, when panel 21*a* is rotated, strap 501 moves toward the tailgate in the direction of the arrow, which causes latch 502 to be rotated clockwise in the direction of the arrow, such that it is no longer under latch flange 524. As a result, panel 21*b* is free to be rotated without resistance. As shown in FIG. 8, if a user attempts to lift panel 21*b*, without fully rotating panel 21*a*, disregarding the initial resistance provided by the latch 502, this abnormally high upward motion causes the latch 502 to flex into a stressed state. In one embodiment, the latch 502 may flex completely around latch flange 524 if the stress continues, such that the cover panel 21*b* is opened without fully rotating panel 21*a*. Once the load is reduced or the latch 502 flexes around latch flange 524, the latch 502 will recover to is generally straight position shown in FIG. 7.

Referring to FIG. 11, the operation of the mounting clamp 507 to an L-shaped member includes placing the first half 510 of the mounting clamp 507 adjacent to an exterior surface of the L-shaped member, and placing the second half 511 of the mounting clamp 507 adjacent to the interior surface of the L-shaped member. The upper flange 527, or first clamp portion is positioned on the exterior surface of the upper body portion 508 of the L-shaped member, and the main body 529, or second clamp portion, is positioned adjacent to the exterior surface of the second body portion 509 of the L-shaped member. The second clamp half 511 is positioned adjacent the interior surface of the L-shaped member, opposite the first clamp half 510. In the illustrated embodiment, the top edge 517, or third clamp portion, is positioned slightly below the first body portion 508 of the L-shaped member, and the front surface 518, or fourth clamp portion, is positioned adjacent the interior surface of the second body portion 509 of the L-shaped member. When the first and second clamp halves 510, 511 are properly positioned, the foot 520 is adjacent to, or in contact with, the bottom flange 514 of the first clamp half.

The bolt 521 is inserted through a slot 526 in the first clamp half 510 and into the second clamp half 511, and then tightened to draw the clamp halves together. As the bolt is tightened, the clamp halves pull together to sandwich the second body portion 509 of the L-shaped member between the second and fourth clamp portions. Also as the bolt 521 is tightened, the foot 520 of the second clamp half rides up the shoulder 513 of the first clamp half 510, and, in particular, up the radiused corner 515 on the first clamp half 510 in the direction of the arrow, and as a result the first and third clamp portions move together to sandwich the first body portion of the L-shaped member.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," the or "said," is not to be construed as limiting the element to the singular.

The invention claimed is:

1. A truck tonneau cover assembly for a truck having an open storage area, said assembly comprising:
    a keeper adapted to be mounted on the truck adjacent the storage area; and
    a tonneau cover adapted to be mounted on the truck over the storage area, said cover including a first panel and a second panel hinged to said first panel, said second hinged panel moveable between closed and opened positions with respect to the storage area, said cover further including a latch movable between a latched position and an unlatched position, said latch being under said keeper when said latch is in said latched position, said latch being horizontally offset from said keeper when said latch is in said unlatched position, said latch including means for urging said latch toward said latched position, said cover further including means for moving said latch automatically from said latched position to said unlatched position as said second panel moves from said closed position to said open position.

2. The truck tonneau cover assembly of claim 1 wherein:
    said latch is sufficiently rigid to retain said cover in position when said latch is in said latched position and when said cover experiences normal loads; and
    said latch is sufficiently resiliently flexible to enable said latch to flex from said latched position vertically past said keeper when said cover experiences abnormally high loads.

3. The truck tonneau cover assembly of claim 2 wherein at least a portion of said latch is made of spring steel.

4. The truck tonneau cover assembly of claim 3 wherein said latch is a spring steel plate that is pivotally mounted on said first panel, wherein a torsion spring is attached to said plate and said first panel to bias said plate in said latched position.

5. The truck tonneau cover assembly of claim 4 wherein said means for moving said latch automatically from said latched to said unlatched position is a strap.

6. The truck tonneau cover assembly of claim 5 wherein said second hinged panel includes a release mechanism and a lock supported within said second hinged panel, said release mechanism including a pivotable lever arm, a pair of latch mechanisms on opposite ends of said second hinged panel, and flexible connectors connected between said lever arm and each of said latch mechanisms, said lever arm movable between a released position in which said latch mechanisms are retracted and an unreleased position in which said latch mechanisms are extended, said lock movable between a locked position and an unlocked position, said lock when in said locked position preventing said lever arm from moving between said unreleased position and said released position, said lock when in said unlocked position permitting said lever arm to move between said unreleased position and said released position.

7. A truck tonneau cover assembly for a truck having an open storage area, said assembly comprising:
    a keeper adapted to be mounted on the truck adjacent the storage area; and
    a tonneau cover adapted to be mounted on the truck over the storage area, said cover including a first hinged panel moveable between closed and opened positions, said cover further including a latch movable between a latched position and an unlatched position, said latch engaging said keeper when said latch is in said latched position, said latch being free of said keeper when said latch is in said unlatched position;

a strap connected to said latch, said strap capable of being pulled to move said latch into said unlatched position; and wherein said latch is sufficiently rigid to retain said cover in position when said cover experiences normal loads and said latch is sufficiently resiliently flexible to enable it to flex around said keeper when said cover experiences abnormally high loads, wherein said latch is a spring steel plate that is pivotally mounted on said cover, wherein a torsion spring is attached to said plate and said cover to bias said plate in said latched position, wherein said tonneau cover includes a second hinged panel connected to said first hinged panel, said first hinged panel including a release mechanism and a lock supported within said first hinged panel, said release mechanism including a pivotable lever arm, a pair of latch mechanisms on opposite ends of said first hinged panel, and flexible connectors connected between said lever arm and each of said latch mechanisms, said lever arm movable between a released position in which said latch mechanisms are retracted and an unreleased position in which said latch mechanisms are extended, said lock movable between a locked position and an unlocked position, said lock when in said locked position preventing said lever arm from moving between said unreleased position and said released position, said lock when in said unlocked position permitting said lever arm to move between said unreleased position and said released position, wherein said strap includes a first end connected to said latch and a second end connected to said first hinged panel, said strap moving said latch to said unlatched position when said first hinged panel is opened.

8. A truck tonneau cover assembly for a truck having an open storage area, said assembly comprising:

a keeper adapted to be mounted on the truck adjacent the storage area; and a tonneau cover adapted to be mounted on the truck over the storage area, said cover including a first panel and a second panel hinged to said first panel, said second hinged panel moveable between closed and opened positions with respect to the storage area, said cover further including a latch movable between a latched position and an unlatched position, said latch being under said keeper when said latch is in said latched position, said latch being horizontally offset from said keeper when said latch is in said unlatched position, said latch being sufficiently rigid to retain said cover in position when said latch is in said latched position and when said cover experiences normal loads, said latch being sufficiently resiliently flexible to enable said latch to flex from said latched position vertically past said keeper when said cover experiences abnormally high loads.

9. The truck tonneau cover assembly of claim 8 wherein at least a portion of said latch is made of spring steel.

10. The truck tonneau cover assembly of claim 9 wherein said latch is a spring steel plate that is pivotally mounted on said cover, wherein a torsion spring is attached to said plate and said cover to bias said plate in said latched position.

* * * * *